(12) United States Patent
Tanaka et al.

(10) Patent No.: US 9,988,156 B2
(45) Date of Patent: Jun. 5, 2018

(54) CYLINDRICAL CASE AND MANUFACTURING METHOD OF CYLINDRICAL CASE

(71) Applicants: IHI Corporation, Tokyo (JP); IHI AEROSPACE CO., LTD., Tokyo (JP)

(72) Inventors: Agamu Tanaka, Tokyo (JP); Hideo Morita, Tokyo (JP); Ikuo Okumura, Tokyo (JP); Yuu Shigenari, Tokyo (JP); Takashi Harada, Tokyo (JP); Yusuke Dan, Tokyo (JP)

(*) Notice: Subject to any disclaimer, the term of this patent is extended or adjusted under 35 U.S.C. 154(b) by 413 days.

(21) Appl. No.: 14/696,073

(22) Filed: Apr. 24, 2015

(65) Prior Publication Data
US 2015/0225087 A1 Aug. 13, 2015

Related U.S. Application Data

(63) Continuation of application No. PCT/JP2013/078586, filed on Oct. 22, 2013.

(30) Foreign Application Priority Data

Oct. 25, 2012 (JP) ................. 2012-235353

(51) Int. Cl.
*B64D 29/02* (2006.01)
*F01D 25/24* (2006.01)
(Continued)

(52) U.S. Cl.
CPC ............ *B64D 29/02* (2013.01); *B29C 33/301* (2013.01); *B29C 70/22* (2013.01); *B29C 70/222* (2013.01);
(Continued)

(58) Field of Classification Search
CPC ....... B64D 29/02; F01D 25/243; F01D 25/24; F01D 21/045; F05D 2220/36;
(Continued)

(56) References Cited

U.S. PATENT DOCUMENTS

| 5,439,627 A | 8/1995 | De Jager |
| 8,231,958 B2 | 7/2012 | Hoover et al. |
| 2009/0098337 A1 | 4/2009 | Xie et al. |

FOREIGN PATENT DOCUMENTS

| EP | 2497625 A1 | 9/2012 |
| JP | 2005-97759 A | 4/2005 |

(Continued)

OTHER PUBLICATIONS

Extended European Search Report, European Patent Application No. 13849096.6, dated May 25, 2016, 8 pgs.
(Continued)

*Primary Examiner* — Michael C Miggins
(74) *Attorney, Agent, or Firm* — Volpe and Koenig, P.C.

(57) ABSTRACT

A cylindrical case includes a case main body, and a groove disposed annularly at one end of the case main body. A peripheral wall of the case main body is formed by alternately laminating a biaxial fabric layer, which includes a biaxial fabric of a non-crimp structure composed of reinforcing fiber bands having an orientation angle of ±45°, and a roving layer. A groove wall of the groove is formed by alternately laminating the biaxial fabric layer, which continues to the case main body side, and a triaxial fabric layer, which includes a triaxial fabric of a non-crimp structure composed of reinforcing fiber bands having an orientation angle of ±45° and a reinforcing fiber band having an orientation angle of 0°.

12 Claims, 10 Drawing Sheets

(51) Int. Cl.
*F01D 21/04* (2006.01)
*B29C 70/44* (2006.01)
*B29C 33/30* (2006.01)
*B29C 70/22* (2006.01)
*B29C 70/24* (2006.01)
*B29C 70/54* (2006.01)
*B29L 31/00* (2006.01)
*B29K 101/10* (2006.01)
*B29L 9/00* (2006.01)
*B29L 22/00* (2006.01)
*B29L 23/00* (2006.01)

(52) U.S. Cl.
CPC ............ *B29C 70/24* (2013.01); *B29C 70/446* (2013.01); *B29C 70/54* (2013.01); *F01D 21/045* (2013.01); *F01D 25/24* (2013.01); *F01D 25/243* (2013.01); *B29K 2101/10* (2013.01); *B29K 2713/00* (2013.01); *B29L 2009/00* (2013.01); *B29L 2022/00* (2013.01); *B29L 2023/003* (2013.01); *B29L 2031/7504* (2013.01); *B29L 2031/772* (2013.01); *F05D 2220/36* (2013.01); *F05D 2300/603* (2013.01); *F05D 2300/6034* (2013.01); *Y02T 50/672* (2013.01)

(58) Field of Classification Search
CPC ....... F05D 2300/603; F05D 2300/6034; B29L 2031/7504; B29L 2009/00; B29L 2022/00; B29L 2031/772; B29C 70/446; B29C 33/301; B29C 70/222; B29C 70/22; B29C 70/24; B29C 70/54; Y02T 50/672; B29K 2101/10; B29K 2713/00
See application file for complete search history.

(56) References Cited

FOREIGN PATENT DOCUMENTS

| | | |
|---|---|---|
| JP | 2006-069166 A | 3/2006 |
| JP | 2006-177364 A | 7/2006 |
| JP | 2009-107337 A | 5/2009 |
| JP | 2011-2069 A | 1/2011 |
| JP | 2011-98524 A | 5/2011 |
| RU | 2094229 C1 | 10/1997 |
| RU | 2290483 C2 | 12/2006 |

OTHER PUBLICATIONS

International Search Report, PCT/JP2013/078586, dated Nov. 19, 2013, 2 pgs.

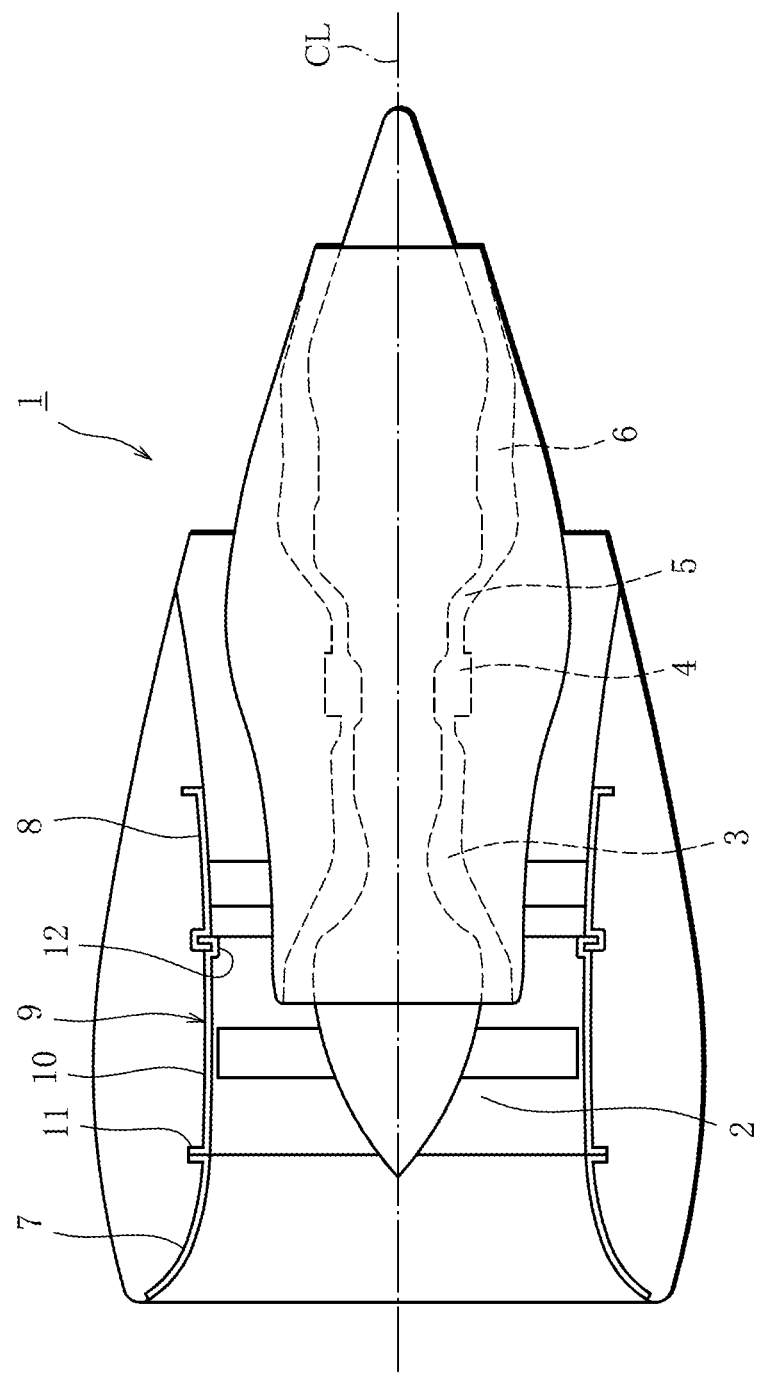

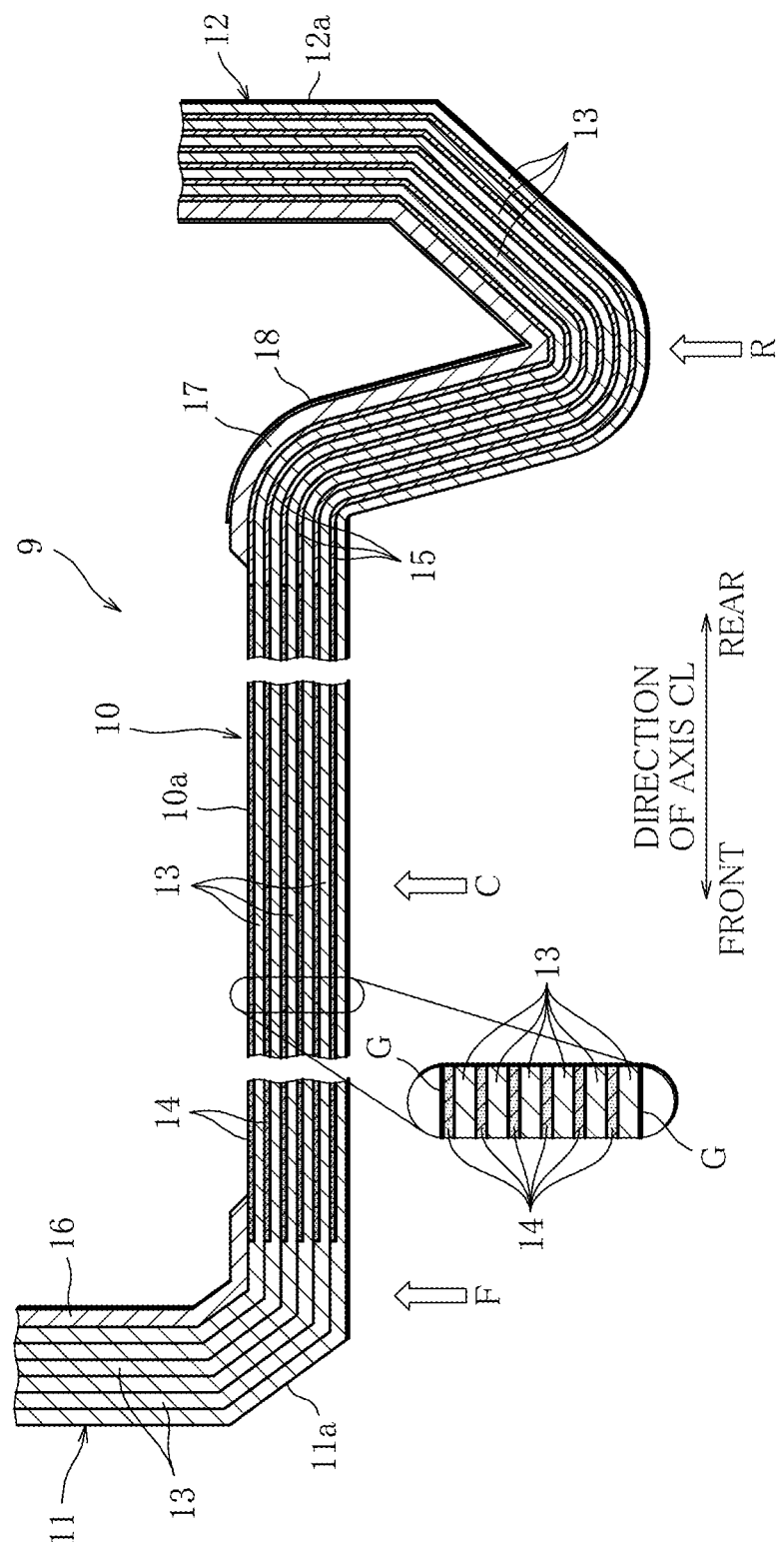

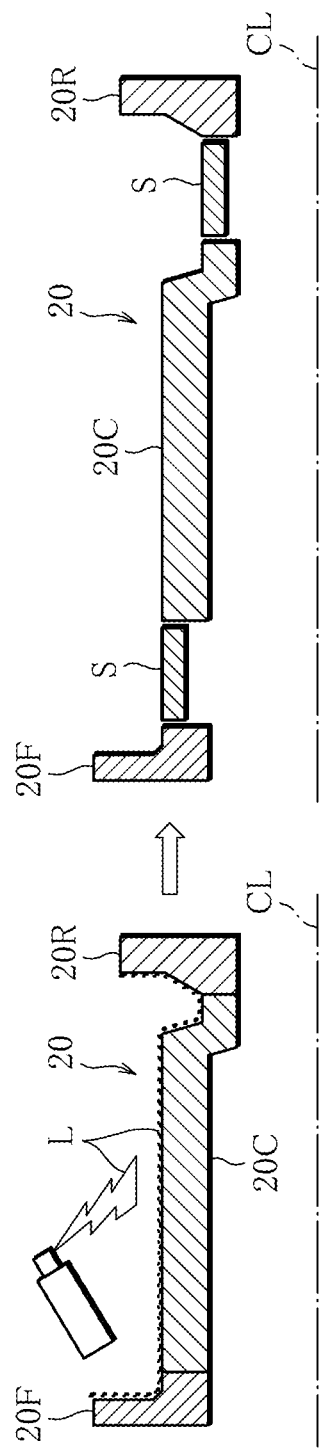

CYLINDRICAL CASE AND MANUFACTURING METHOD OF CYLINDRICAL CASE

TECHNICAL FIELD

The present invention relates to a cylindrical case which is used, for example, as a fan case for covering the fan blades of an aircraft jet engine, and to a manufacturing method of the cylindrical case.

BACKGROUND ART

The above fan case for covering the fan blades of an aircraft jet engine is required to be lightweight and have high strength, and in order to meet these requirements, there are attempts of adopting a composite material consisting of reinforcing fibers and a thermosetting resin as the raw material of the fan case.

The above fan case has an annular outward flange, which is typically coupled with an engine nacelle, integrally formed at one end of a case main body covering the fan blades. Therefore, when a composite material consisting of reinforcing fibers such as carbon fibers and a thermosetting resin such as an epoxy resin is used as the raw material, both the case main body and the annular flange have a plurality of fabric layers including a fabric composed of reinforcing fibers such as carbon fibers.

To manufacture the above fan case (cylindrical case) using a composite material consisting of reinforcing fibers and a thermosetting resin, a cylindrical mandrel is rotated on its axis while the fabric is wound around the molding surface of the mandrel to form a laminate of fabric layers, and this laminate is heated to cure the thermosetting resin with which the laminate is pre-impregnated.

In the above fan case, in order to secure sufficient strength and rigidity, it is necessary that reinforcing fibers having an inclination angle of ±0-75° to the circumferential direction of the case main body are included between the plurality of fabric layers, and such a fan case is described in Patent Document 1, for example.

PRIOR ART DOCUMENT

Patent Document

Patent Document 1: Japanese Patent Laid-Open No. 2009-107337

SUMMARY OF THE INVENTION

Problems to be Solved by the Invention

However, in the case where there is an annular outward flange at the end of the case main body as with the above fan case (cylindrical case), if one tries to secure sufficient strength and rigidity of the laminate by including reinforcing fibers having an inclination angle of 0-10° to the circumferential direction between the plurality of fabric layers, as the flexibility of the fabric included in the fabric layer is impaired, wrinkling or fiber meandering occurs in a part corresponding to the bent root of the outward flange during molding of the laminate, which may reduce the strength and the rigidity of the outward flange. As a result, the strength and the rigidity of the entire fan case cannot be increased, and solving this problem is a hitherto existing challenge.

The present invention has been devised, with a focus on the above existing challenge, and an object of the present invention is to provide a cylindrical case with which it is possible to secure high strength and rigidity of the entire case in the case where the cylindrical case is made of a composite material consisting of, for example, reinforcing fibers and a thermosetting resin as the raw material and is a fan case having an outward annular groove or an annular flange, and to provide a manufacturing method of the cylindrical case.

Means for Solving the Problems

In order to achieve the above object, the present invention provides a cylindrical case made of a composite material of reinforcing fibers impregnated with a thermosetting resin, the cylindrical case including:

a case main body forming a cylindrical shape; and a groove which is disposed at one end of the case main body annularly along a circumferential direction and is open to a distal side, wherein a peripheral wall of the case main body is formed by alternately laminating a plurality of biaxial fabric layers, which include a biaxial fabric of a non-crimp structure composed of two axes of reinforcing fiber bands having an orientation angle of ±15-75° to an axial direction of the case main body, and a plurality of roving layers, which, include a roving composed of a bundle of reinforcing fibers extending along the circumferential direction of the case main body, and a groove wall of the groove is formed by alternately laminating a plurality of biaxial fabric layers, which continue to the plurality of biaxial fabric layers in the peripheral wall of the case main body, and a plurality of triaxial fabric layers, which include a triaxial fabric of a non-crimp structure composed of total three axes of reinforcing fiber bands: two axes of reinforcing fiber bands having an orientation angle of ±15-75° to the axial direction of the case main body, and one axis of reinforcing fiber band having an orientation angle of 0° to the axial direction of the case main body.

It is preferable that front and back surfaces of each of the peripheral wall of the case main body and the groove wall of the groove are all coated with a protective film made of a composite material of reinforcing fibers impregnated with a thermosetting resin.

It is preferable that the groove wall of the groove is coated with a Ti-alloy or Ni-alloy cover, and the cylindrical case is used as a fan case for covering fan blades of an aircraft jet engine.

The present invention further provides a manufacturing method of the above-described cylindrical case, including:

molding a laminate having a part corresponding to the case main body by repeatedly performing the following steps:

a biaxial fabric layer forming step of rotating a cylindrical mandrel, of which the outer peripheral surface serves as a molding surface, on its axis while winding the biaxial fabric of a non-crimp structure composed of the two axes of reinforcing fiber bands around the molding surface of the mandrel to form the biaxial fabric layers;

a roving layer forming step of rotating the mandrel on its axis while winding the roving composed of a bundle of reinforcing fibers spirally around a case main body molding portion in the molding surface along a circumferential direction to form the roving layers; and a triaxial fabric layer forming step of rotating the mandrel on its axis while winding the triaxial fabric of a non-crimp structure composed of the three axes of reinforcing fiber bands around a groove molding portion in the molding surface of the mandrel to form the triaxial fabric layers; and thereafter going through the following steps:

a groove molding step of molding a part corresponding to the groove at the end of the part corresponding to the case main body in the laminate by means of a groove molding die and a groove molding part located at the end of the mandrel; and a heating step of heating the laminate, in which the part corresponding to the groove is molded at the end of the part corresponding to the case main body in the groove molding step, to thereby cure the thermosetting resin with which each of the reinforcing fibers of the fabric layers are impregnated.

The present invention further provides a manufacturing method of the above-described cylindrical case, including:

molding a laminate of a part corresponding to the case main body by repeatedly performing the following steps:

a biaxial fabric layer forming step of rotating a cylindrical mandrel, of which the outer peripheral surface serves as a case main body molding surface, on its axis while winding the biaxial fabric of a non-crimp structure composed of the two axes of reinforcing fiber bands around the molding surface of the mandrel to form the biaxial fabric layers; and a roving layer forming step of rotating the mandrel on its axis while winding the roving composed of a bundle of reinforcing fibers spirally around the molding surface of the mandrel along a circumferential direction to form the roving layers;

while molding a laminate for the groove by repeatedly performing the following steps:

a biaxial fabric layer forming step of rotating a cylindrical mandrel for the groove, of which the outer peripheral surface serves as a groove molding surface, on its axis while winding the biaxial fabric of a non-crimp structure composed of the two axes of reinforcing fiber bands around the groove molding surface of the mandrel for the groove to form the biaxial fabric layers; and a triaxial fabric layer forming step of rotating the mandrel for the groove on its axis while winding the triaxial fabric of a non-crimp structure composed of the three axes of reinforcing fiber bands around the groove molding surface of the mandrel for the groove to form the triaxial fabric layers; and thereafter going through the following steps:

a groove molding step of molding the laminate for the groove into a part corresponding to the groove by means of a groove molding die and the mandrel for the groove;

an integrating step of integrating the laminate for the groove, which is molded as the part corresponding to the groove in the groove molding step, and the laminate, which is molded as the part corresponding to the case main body, with each other; and a heating step of heating the laminate of the part corresponding to the case main body and the laminate for the groove molded as the part corresponding to the groove, which are integrated with each other in the integrating step, to cure the thermosetting resin with which each of the reinforcing fibers of the fabrics are impregnated.

In the cylindrical case and the manufacturing method of the cylindrical case according to the present invention, for example, carbon fibers, glass fibers, organic fibers (aramid, PBO, polyester, polyethylene), alumina fibers, and silicon carbide fibers can be used as the reinforcing fibers of the composite material of the cylindrical case, and for the thermosetting resin as a matrix, for example, polyester resin, epoxy resin, vinyl ester resin, phenol resin, bismaleimide resin, oxazoline resin, and melamine resin can be used.

In the cylindrical case according to the present invention, since the peripheral wall of the case main body is formed by alternately laminating the plurality of biaxial fabric layers, which include the biaxial fabric composed of the reinforcing fiber bands such as carbon fibers, and the plurality of roving layers, which include the roving composed of a bundle of reinforcing fibers such as carbon fibers extending along the circumferential direction of the case main body, the strength and the rigidity of the entire cylindrical case are secured.

Moreover, in the cylindrical case according to the present invention, since the groove wall of the groove is formed by alternately laminating the plurality of biaxial fabric layers, which continue to the peripheral wall of the case main body, and the plurality of triaxial fabric layers composed of the triaxial reinforcing fiber bands with the orientation angle of one of the reinforcing fiber bands directed to the axial direction of the case main body, it is possible to enhance the strength and the rigidity of the groove wall against a load in the axial direction while maintaining the strength and the rigidity of the entire cylindrical case.

In addition, since the triaxial fabric layers with the orientation angle of one of the reinforcing fiber bands directed to the axial direction of the case main body is adopted for the groove wall of the groove, expansion of the groove wall of the groove in the circumferential direction is tolerated, so that the groove is molded without developing wrinkling or fiber meandering, and automatic molding for labor saving or shortening of the construction period becomes possible.

Advantageous Effects of the Invention

The cylindrical case according to the present invention offers an excellent advantage in that high strength and rigidity of the entire case can be secured.

BRIEF DESCRIPTION OF THE DRAWINGS

FIG. 1 is a schematic cross-sectional view illustrating an aircraft jet engine in which a fan case according to one embodiment of the present invention is adopted.

FIG. 2 is a partial enlarged cross-sectional view illustrating the fan case of FIG. 1.

FIG. 4A is a view of a first step illustrating the status at the start of manufacturing in a manufacturing method of the fan case of FIG. 1.

MODE FOR CARRYING OUT THE INVENTION

Figure 3A:
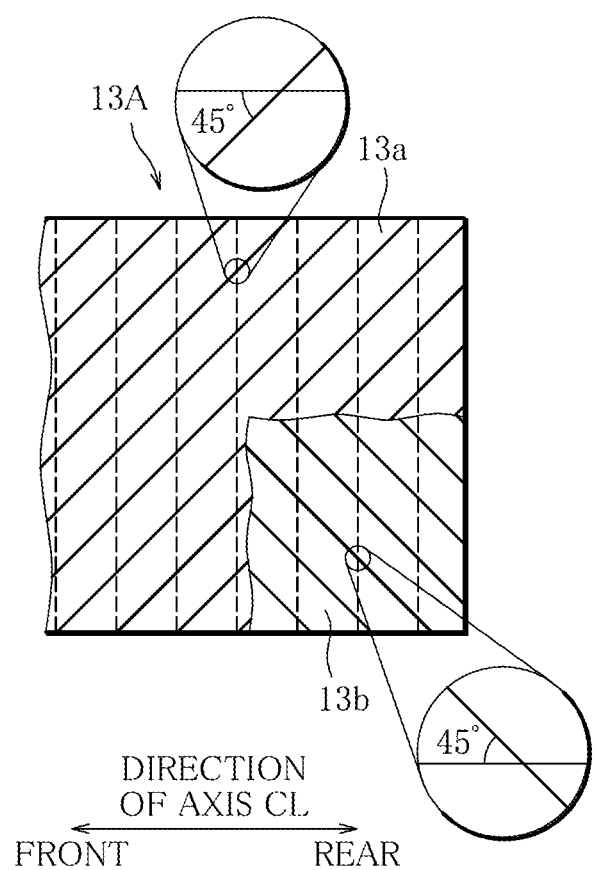
FIG. 3A is a partial planar view illustrating the lamination state of a fabric in the part F of FIG. 2 partially cut away.

In the following, the present invention will be described on the basis of the drawings.

FIG. 1 to FIG. 5F show one embodiment of a cylindrical case according to the present invention, and in this embodiment, a case where the cylindrical case according to the present invention is a fan case of an aircraft jet engine will be taken as an example.

As shown in FIG. 1, an aircraft jet engine 1 sends air taken in from a front side (left side in the drawing) into a compressor 3 by means of a fan 2 having a plurality of fan blades, injects a fuel to the air compressed in this compressor 3 to combust them in a combustion chamber 4, and rotates a high-pressure turbine 5 and a low-pressure turbine 6 through expansion of a high-temperature gas generated by combustion.

A fan case 9 which covers the plurality of fan blades of the fan 2 is made of a composite material of reinforcing fibers such as carbon fibers impregnated with a thermosetting resin such as an epoxy resin, and includes a case main body 10 which forms a cylindrical shape.

At the front end (left end in the drawing) of this case main body 10, an outward annular flange 11 which can be coupled with an engine cowl 7 Is formed, and at the rear end (right end in the drawing), a groove 12 which is open to the distal side is formed annularly, and metal inward flange of an engine nacelle 8, for example, is fitted into this annular groove 12.

In this case, as shown in FIG. 2, an upright wall 11a of the annular flange 11 is formed by laminating a plurality of biaxial fabric layers 13, and as shown in FIG. 3A, this biaxial fabric layer 13 includes a biaxial fabric 13A composed of reinforcing fiber bands 13a, 13b such as carbon fibers. This biaxial fabric 13A forms a non-crimp structure composed of two axes of reinforcing fiber bands 13a, 13b, and the orientation angle to the direction of an axis CL of the case main body 10 in the two axes of reinforcing fiber bands 13a, 13b is set to ±15-75°, and in this embodiment, as shown in the enlarged circles of FIG. 3A, the orientation angle is set to ±45°. The portions indicated by the dashed lines in FIG. 3A are stitch threads.

Here, an absolute value of the orientation angle of the two axes of reinforcing fiber bands 13a, 13b to the direction of the axis CL smaller than 15° makes it difficult to secure the strength and the rigidity of the fan case 9 and is therefore not favorable. On the other hand, an absolute value of the orientation angle of the two axes of reinforcing fiber bands 13a, 13b to the direction of the axis CL larger than 75° may lead to wrinkling or fiber meandering occurring during the manufacture of the fan case 9 and is therefore not favorable, either.

Figure 3B:
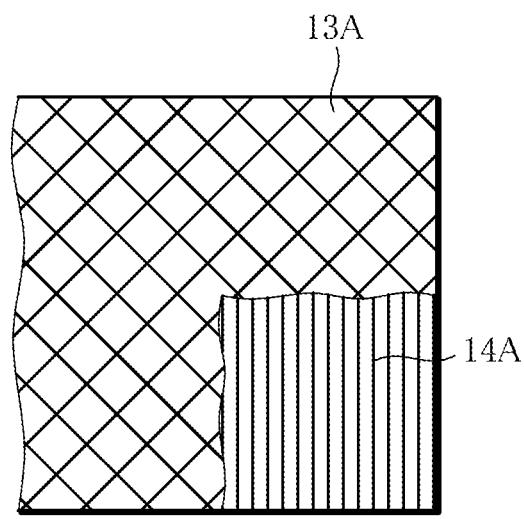
FIG. 3B is a partial planar view illustrating the lamination state of a fabric and a roving in the part C of FIG. 2 partially cut away.

The peripheral wall 10a of the case main body 10 is formed by alternately laminating the plurality of biaxial fabric layers 13 which continue to the upright wall 11a of the annular flange 11, namely, the plurality of biaxial fabric layers 13 including the biaxial fabric 13A composed of the two axes of reinforcing fiber bands 13a, 13b with the orientation angle to the direction of the axis CL set to ±15-75° (the orientation angle is ±45° in this embodiment) and a plurality of roving layers 14, and as shown in FIG. 3B, this roving layer 14 includes a roving (fiber bundle) 14A composed of a bundle of reinforcing fibers such as carbon fibers extending along the circumferential direction of the case main body 10.

Here, if the inclination angle of the roving 14A to the circumferential direction of the case main body 10 exceeds 15°, it becomes difficult to secure the strength and the rigidity of the fan case 9 during the manufacture, and therefore the above inclination angle is desirably 15° or smaller.

Needles to say, the case main body 10 is required to prevent the distal end side of the fan blade which is broken and scattered when encountering a bird strike, for example, from penetrating the peripheral wall 10a, and accordingly, in this embodiment, a plurality of fabric layers (not shown) including a reinforcing fiber band with the orientation angle to the direction of the axis CL set to 30° are laminated on the peripheral wall 10a of the case main body 10. Thus, if the plurality of fabric layers including the reinforcing fiber band with the orientation angle of 30° are laminated on the peripheral wall 10a, when the fan blade is twisted, for example, at an angle of 60° to the axis CL, as the reinforcing fiber band having the orientation angle of 30° is almost orthogonal to the distal end side of the fan blade, penetration of fragments of the fan blade can be blocked.

The groove wall 12a of the groove 12 is formed by alternately laminating the plurality of biaxial fabric layers 13 which continue to the peripheral wall 10a of the case main body 10, namely, the plurality of biaxial fabric layers 13 including the biaxial fabric 13A composed of the two axes of reinforcing fiber bands 13a, 13b with the orientation angle to the direction of the axis CL set to ±45°, and a plurality of triaxial fabric layers 15.

Figure 3C:
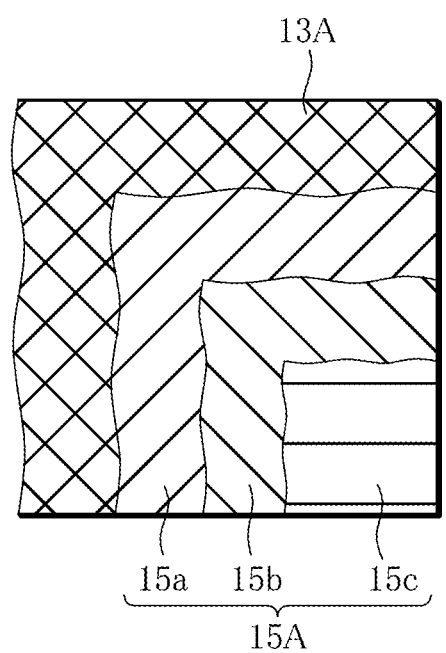
FIG. 3C is a partial planar view illustrating the lamination state of a fabric in the part R of FIG. 2 partially cut away.

As shown in FIG. 3C, this triaxial fabric layer 15 includes a triaxial fabric 15A of a non-crimp structure composed of total three axes of reinforcing fiber bands 15a, 15b, 15c: two axes of reinforcing fiber bands 15a, 15b having an orientation angle of ±15-75° (the orientation angle is ±45° in this embodiment) to the direction of the axis CL of the case main body 10, and one axis of reinforcing fiber band 15c having an orientation angle of 0° to the direction of the axis CL of the case main body 10.

Moreover, front and back surfaces of each of the peripheral wall 10a of the case main body 10, the upright wall 11a of the annular flange 11, and the groove wall 12a of the groove 12 are all coated with a protective film G (shown only inside the enlarged ellipse of FIG. 2) made of a composite material of reinforcing fibers such as glass fibers impregnated with a thermosetting resin such as an epoxy resin. For example, this protective film G serves as a cutting allowance during machining after molding of the case main body 10, as well as serves as an electric corrosion preventive material. In addition, this protective film G serves also as a protective layer when the fan case 9 as a completed product is handled.

Furthermore, protective layers 16, 17 composed of a composite material of reinforcing fibers such as glass fibers impregnated with a thermosetting resin such as an epoxy resin are disposed, both in a segmented state, between the case main body 10 and the annular flange 11 and between the case main body 10 and the groove 12.

The groove wall 12a of the groove 12 coated with the protective film G as described above is coated with a Ti-alloy or Ni-alloy cover 18 so as to avoid wear, for example, when a Ti-alloy inward flange formed in the engine nacelle 8 is fitted.

Now, a manufacturing method of the above-described fan case 9 will be described.

First, as shown in FIG. 4A, as a first step, a mold release agent L is sprayed on each molding surface of a cylindrical mandrel 20C, a flange molding die 20F, which can be moved closer to or away from the front end (left end in the drawing) of this mandrel 20c, and a groove molding die 20R, which can be moved closer to or away from the rear end (right end in the drawing) of the mandrel 20C, all of which constitute a melding device 20.

Subsequently, spacers S are placed respectively at the front and rear ends of the mandrel 20C in place of the flange molding die 20F and the groove molding die 20R having been moved away from the mandrel 20C.

Figure 4B:
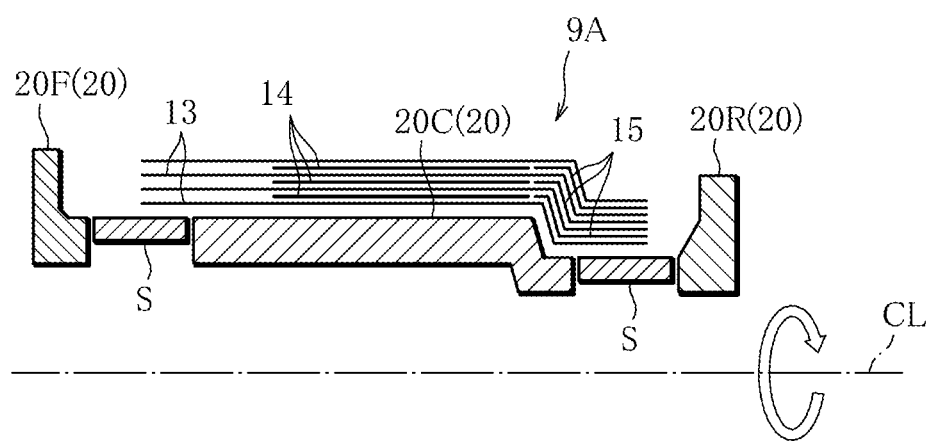
FIG. 4B is a view of a second step illustrating the status on completion of lamination of a fabric in the manufacturing method of the fan case of FIG. 1.

Thereafter, as shown in FIG. 4B, as a second step, a laminate 9A having a part corresponding to the case main body 10 is molded by repeating the following steps: a biaxial fabric layer forming step of rotating the mandrel 20C and the spacer S on the axis CL while winding the biaxial fabric 13A around the molding surface of the mandrel 20C to form the biaxial fabric layers 13; a roving layer forming step of winding the roving 14A spirally around a molding portion for the case main body 10 in the molding surface of the mandrel 20C along the circumferential direction to form the roving layers 14; and a triaxial fabric layer forming step of winding the triaxial fabric 15A around a molding portion for the groove 12 in the molding surface of the mandrel 20C to form the triaxial fabric layers 15. After these steps, the surface of the laminate 9A is coated with the protective film G.

Figure 5A:
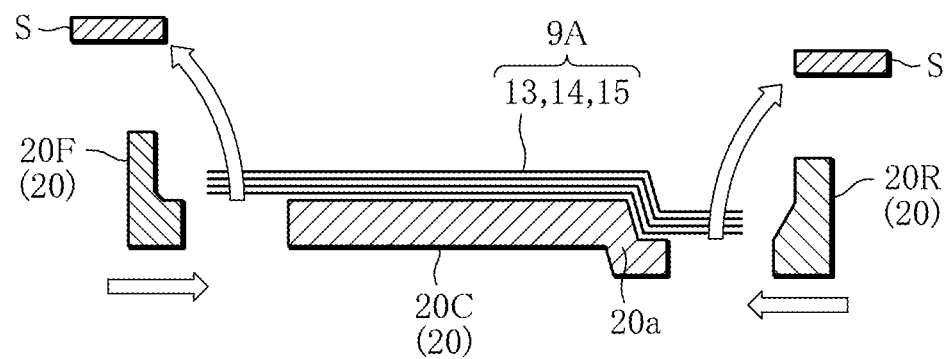
FIG. 5A is a view illustrating a third step which is a molding step in the manufacturing method of the fan case of FIG. 1.

Next, as shown in FIG. 5A, as a third step, after moving the spacers S away from the front and rear ends of the mandrel 20C, the flange molding die 20F and the groove molding die 20R are moved closer to the front and rear end, respectively, of the mandrel 20C.

Figure 5B:
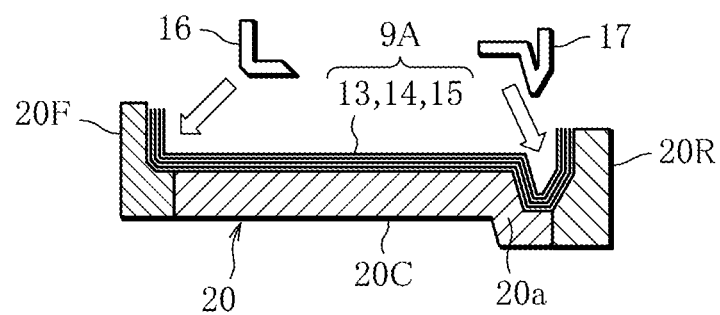
FIG. 5B is a view illustrating a fourth step which is a molding step in the manufacturing method of the fan case of FIG. 1.

Then, as shown in FIG. 5B, as a fourth step, a part corresponding to the annular flange 11 is molded at the front end of the laminate 9A by means of the flange molding die 20F and the front end of the mandrel 20C, while a part corresponding to the groove 12 is molded at the rear end of the laminate 9A by means of the groove molding die 20R and the groove molding part 20a located at the rear end of the mandrel 20C.

Figure 5C:
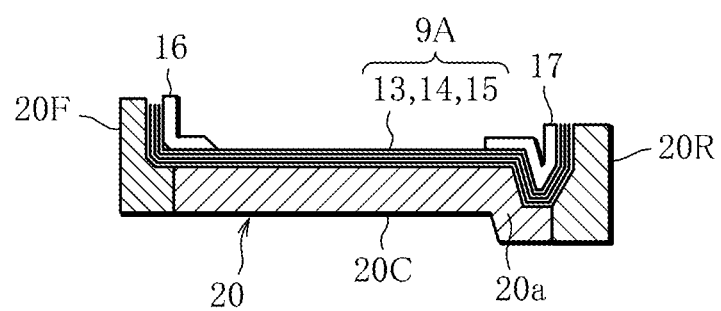
FIG. 5C is a view illustrating a fifth step which is a molding step in the manufacturing method of the fan case of FIG. 1.
Figure 5D:
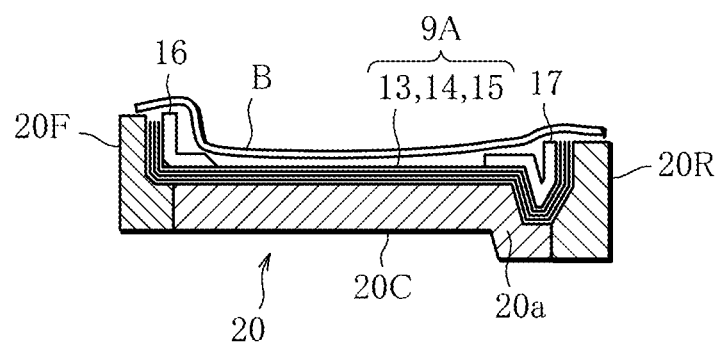
FIG. 5D is a view illustrating a sixth step which is a molding step in the manufacturing method of the fan case of FIG. 1.

Next, as shown in FIG. 5C, as a fifth step, the protective layers 16, 17 are disposed respectively between the part corresponding to the case main body of the laminate 9A and the part corresponding to the flange and between the part corresponding to the case main body and the part corresponding to the groove, and thereafter, as shown in FIG. 5D, as a sixth step, a heating and pressurizing step of covering the laminate 9A on the molding device 20 with a bag B, and heating and pressurizing the laminate 9A while evacuating the inside of the bag B is performed to cure the thermosetting resin with which the reinforcing fibers of the layers 13, 14, 15 are impregnated.

Figure 5E:
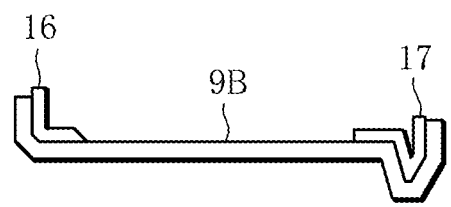
FIG. 5E is a view illustrating a seventh step which is a molding step in the manufacturing method of the fan case of FIG. 1.
Figure 5F:
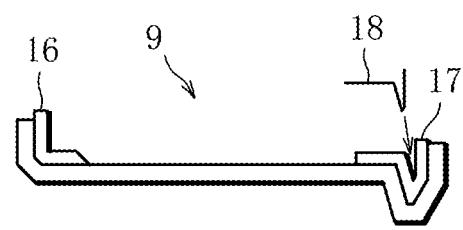
FIG. 5F is a view illustrating an eighth step which is a molding step in the manufacturing method of the fan case of FIG. 1.

As shown in FIG. 5E, after completion of this heating and pressurizing step, as a seventh step, a laminate 9B obtained upon curing of the thermosetting resin, with which the reinforcing fibers of the layers 13, 14, 15 are impregnated, is released from the molding device 20, and subsequently, as shown in FIG. 5F, as an eighth step, the laminate 9B released from the molding device 20 is machined into the shape of the fan case 9, and then the groove wall 12a of the groove 12 is coated with the Ti-alloy or Ni-alloy cover 18.

As described above, in the fan case 9 of this embodiment, since the upright wall 11a of the annular flange 11 is formed by laminating the plurality of biaxial fabric layers 13 which include only the biaxial fabric 13A composed of the reinforcing fiber bands 13a, 13b such as carbon fibers, as the stretchability which is characteristic of the non-crimp structure is exerted, the annular flange 11 is molded without developing wrinkling or fiber meandering.

Moreover, in the fan case 9 of this embodiment, the peripheral wall 10a of the case main body 10 is formed by alternately laminating the plurality of biaxial fabric layers 13, which include the biaxial fabric 13A composed of the reinforcing fiber bands 13a, 13b such as carbon fibers, and the plurality of roving layers 14, which include the roving 14A composed of a bundle of reinforcing fibers such as carbon fibers extending along the circumferential direction of the case main body 10, the strength and the rigidity of the entire fan case 9 are secured.

Furthermore, in the fan case 9 of this embodiment, since the groove wall 12a of the groove 12 is formed by alternately laminating the plurality of biaxial fabric layers 13, which continue to the peripheral wall 10a of the case main body 10, and the plurality of triaxial fabric layers 15 composed of the reinforcing fiber bands 15a, 15b, 15c of three axial directions with the orientation angle of one reinforcing fiber band 15c directed to the direction of the axis CL of the case main body 10, it is possible to enhance the strength and the rigidity of the groove wall 12a against a load in the direction of the axis CL while maintaining the strength and the rigidity of the fan case 9.

In addition, since the triaxial fabric layer 15 having the orientation angle of one reinforcing fiber band 15c directed to the direction of the axis CL of the case main body 10 is adopted for the groove wall 12a of the groove 12, expansion of the groove wall 12a of the groove 12 in the circumferential direction is tolerated, so that the groove 12 is molded without developing wrinkling or fiber meandering, and automatic molding for labor saving and shortening of the construction period becomes possible.

In the manufacturing method of the fan case according to the above-described embodiment, after the laminate 9A having the part corresponding to the case main body is molded by repeatedly performing the biaxial fabric layer forming step, the roving layer forming step, and the triaxial fabric layer forming step, the part corresponding to the groove 12 is integrally molded at the end of the part corresponding to the case main body 10 in the laminate 9A. However, the present invention is not limited to this example, and, for example, the laminate of the part corresponding to the case main body may be molded by repeatedly performing the biaxial fabric layer forming step and the roving layer forming step, and at the same time the laminate for the groove may be molded by repeatedly performing the biaxial fabric layer forming step and the triaxial fabric layer forming step, and thereafter, a groove molding step of molding the laminate for the groove into the part corresponding to the groove may be performed, and the laminate for the groove and the laminate molded as the part corresponding to the case main body may be integrated with each other in an integrating step.

Figure 6A:
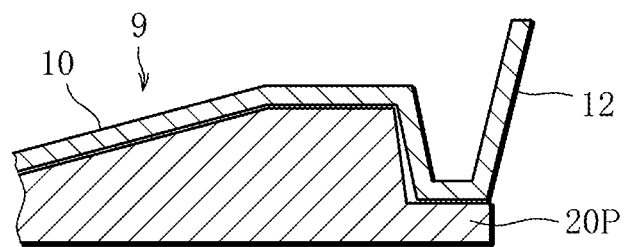
FIG. 6A is a partial cross-sectional view illustrating a mandrel used for manufacturing the fan case according to another embodiment of the present invention.
Figure 6B:
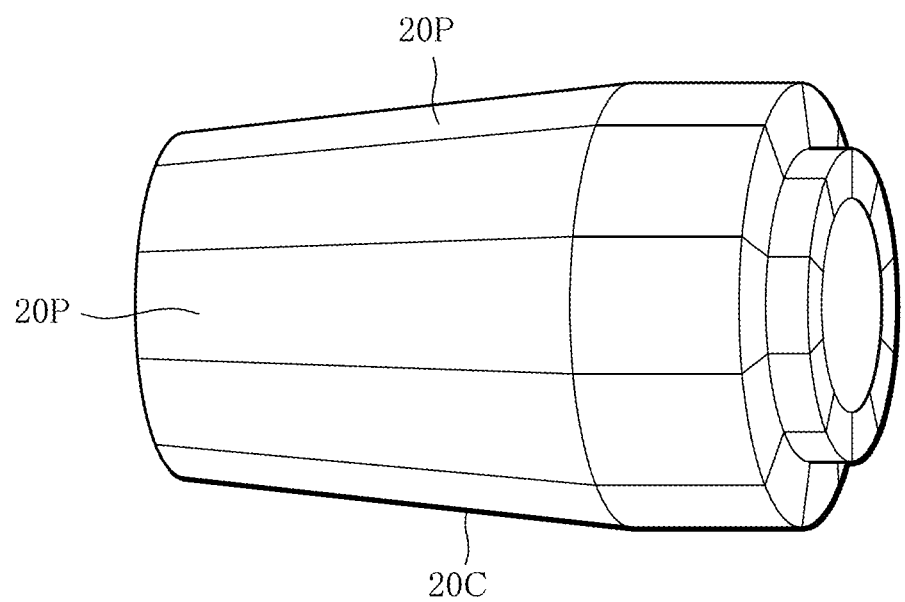
FIG. 6B is an overall perspective view illustrating the mandrel shown in FIG. 6A.

The fan case 9 according to the above-described embodiment has the case main body 10 which forms a straight shape. However, as shown in FIG. 6A, when the case main body 10 of the fan case 9 is inclined relative to the axis CL, the mandrel 20C composed of a plurality of divided pieces 20P shown in FIG. 6B is adopted in view of releasing the molded fan case 9 from the molding die.

The configurations of the cylindrical case and the manufacturing method of the cylindrical case according to the present invention are not limited to the above-described embodiments.

EXPLANATION OF REFERENCE SIGNS

1 Aircraft jet engine
9 Fan case
9A Laminate before heating
9B Laminate after heating
10 Case main body
10a Peripheral wall
12 Groove
12a Groove wall
13 Biaxial fabric layer
13A Biaxial fabric
13a, 13b Two axis of reinforcing fiber bands
14 Roving layer
14A Roving
15 Triaxial fabric layer
15A Triaxial fabric
15a, 15b, 15c Three axes of reinforcing fiber bands
18 Cover
20C Mandrel
20R Groove molding die
20a Groove molding part
CL Axis
G Protective film

The invention claimed is:

1. A cylindrical case made of a composite material of reinforcing fibers impregnated with a thermosetting resin, the cylindrical case comprising:
    a case main body forming a cylindrical shape; and
    a groove which is disposed at one end of the case main body annularly along a circumferential direction and is open to a distal side, wherein
    a peripheral wall of the case main body is formed by alternately laminating a plurality of biaxial fabric layers, which include a biaxial fabric of a non-crimp structure composed of two axes of reinforcing fiber bands having an orientation angle of ±15-75° to an axial direction of the case main body, and a plurality of roving layers, which include a roving composed of a bundle of reinforcing fibers extending along the circumferential direction of the case main body, and
    a groove wall of the groove is formed by alternately laminating a plurality of biaxial fabric layers, which continue to the plurality of biaxial fabric layers in the peripheral wall of the case main body, and plurality of triaxial fabric layers, which include a triaxial fabric of a non-crimp structure composed of total three axes of reinforcing fiber bands: two axes of reinforcing fiber bands having an orientation angle of ±15-75° to the axial direction of the case main body, and one axis of reinforcing fiber band having an orientation angle of 0° to the axial direction of the case main body.

2. The cylindrical case according to claim 1, wherein the groove wall of the groove is coated with a Ti-alloy or Ni-alloy cover, and the cylindrical case is used as a fan case for covering fan blades of an aircraft jet engine.

3. The cylindrical case according to claim 1, wherein front and back surfaces of each of the peripheral wall of the case main body and the groove wall of the groove are all coated with a protective film made of a composite material of reinforcing fibers impregnated with a thermosetting resin.

4. The cylindrical case according to claim 3, wherein the groove wall of the groove is coated with a Ti-alloy or Ni-alloy cover, and the cylindrical case is used as a fan case for covering fan blades of an aircraft jet engine.

5. A manufacturing method of the cylindrical case according to claim 1, including:
    molding a laminate having a part corresponding to the case main body by repeatedly performing the following steps:
    a biaxial fabric layer forming step of rotating a cylindrical mandrel, of which the outer peripheral surface serves as a molding surface, on its axis while winding the biaxial fabric of a non-crimp structure composed of the two axes of reinforcing fiber bands around the molding surface of the mandrel to form the biaxial fabric layers;
    a roving layer forming step of rotating the mandrel on its axis while winding the roving composed of a bundle of reinforcing fibers spirally around a case main body molding portion in the molding surface of the mandrel along a circumferential direction to form the roving layers; and
    a triaxial fabric layer forming step of rotating the mandrel on its axis while winding the triaxial fabric of a non-crimp structure composed of the three axes of reinforcing fiber bands around a groove molding portion in the molding surface of the mandrel to form the triaxial fabric layers; and
    thereafter going through the following steps:
    a groove molding step of molding a part corresponding to the groove at the end of the part corresponding to the case main body in the laminate by means of a groove molding die and a groove molding part located at the end of the mandrel; and
    a heating step of heating the laminate, in which the part corresponding to the groove is molded at the end of the part corresponding to the case main body in the groove molding step, to thereby cure the thermosetting resin with which the reinforcing fibers of each of the fabric layers are impregnated.

6. A manufacturing method of the cylindrical case according to claim 3, including:
    molding a laminate having a part corresponding to the case main body by repeatedly performing the following steps:
    a biaxial fabric layer forming step of rotating a cylindrical mandrel, of which the outer peripheral surface serves as a molding surface, on its axis while winding the biaxial fabric of a non-crimp structure composed of the two axes of reinforcing fiber bands around the molding surface of the mandrel to form the biaxial fabric layers;
    a roving layer forming step of rotating the mandrel on its axis while winding the roving composed of a bundle of reinforcing fibers spirally around a case main body molding portion in the molding surface of the mandrel along a circumferential direction to form the roving layers; and
    a triaxial fabric layer forming step of rotating the mandrel on its axis while winding the triaxial fabric of a non-crimp structure composed of the three axes of reinforcing fiber bands around a groove molding portion in the molding surface of the mandrel to form the triaxial fabric layers; and
    thereafter going through the following steps:
    a groove molding step of molding a part corresponding to the groove at the end of the part corresponding to the case main body in the laminate by means of a groove molding die and a groove molding part located at the end of the mandrel; and a heating step of heating the laminate, in which the part corresponding to the groove is molded at the end of the part corresponding to the case main body in the groove molding step, to thereby cure the thermosetting resin with which the reinforcing fibers of each of the fabric layers are impregnated.

7. A manufacturing method of the cylindrical case according to claim 2, including:

molding a laminate having a part corresponding to the case main body by repeatedly performing the following steps:

a biaxial fabric layer forming step of rotating a cylindrical mandrel, of which the outer peripheral surface serves as a molding surface, on its axis while winding the biaxial fabric of a non-crimp structure composed of the two axes of reinforcing fiber bands around the molding surface of the mandrel to form the biaxial fabric layers;

a roving layer forming step of rotating the mandrel on its axis while winding the roving composed of a bundle of reinforcing fibers spirally around a case main body molding portion in the molding surface of the mandrel along a circumferential direction to form the roving layers; and a triaxial fabric layer forming step of rotating the mandrel on its axis while winding the triaxial fabric of a non-crimp structure composed of the three axes of reinforcing fiber bands around a groove molding portion in the molding surface of the mandrel to form the triaxial fabric layers; and thereafter going through the following steps:

a groove molding step of molding a part corresponding to the groove at the end of the part corresponding to the case main body in the laminate by means of a groove molding die and a groove molding part located at the end of the mandrel; and a heating step of heating the laminate, in which the part corresponding to the groove is molded at the end of the part corresponding to the case main body in the groove molding step, to thereby cure the thermosetting resin with which the reinforcing fibers of each of the fabric layers are impregnated.

8. A manufacturing method of the cylindrical case according to claim 4, including:

molding a laminate having a part corresponding to the case main body by repeatedly performing the following steps:

a biaxial fabric layer forming step of rotating a cylindrical mandrel, of which the outer peripheral surface serves as a molding surface, on its axis while winding the biaxial fabric of a non-crimp structure composed of the two axes of reinforcing fiber bands around the molding surface of the mandrel to form the biaxial fabric layers;

a roving layer forming step of rotating the mandrel on its axis while winding the roving composed of a bundle of reinforcing fibers spirally around a case main body molding portion in the molding surface of the mandrel along a circumferential direction to form the roving layers; and a triaxial fabric layer forming step of rotating the mandrel on its axis while winding the triaxial fabric of a non-crimp structure composed of the three axes of reinforcing fiber bands around a groove molding portion in the molding surface of the mandrel to form the triaxial fabric layers; and thereafter going through the following steps:

a groove molding step of molding a part corresponding to the groove at the end of the part corresponding to the case main body in the laminate by means of a groove molding die and a groove molding part located at the end of the mandrel; and a heating step of heating the laminate, in which the part corresponding to the groove is molded at the end of the part corresponding to the case main body in the groove molding step, to thereby cure the thermosetting resin with which the reinforcing fibers of each of the fabric layers are impregnated.

9. A manufacturing method of the cylindrical case according to claim 1, including:

molding a laminate of a part corresponding to the case main body by repeatedly performing the following steps:

a biaxial fabric layer forming step of rotating a cylindrical mandrel, of which the outer peripheral surface serves as a case main body molding surface, on its axis while winding the biaxial fabric of a non-crimp structure composed of the two axes of reinforcing fiber bands around the molding surface of the mandrel to form the biaxial fabric layers; and a roving layer forming step of rotating the mandrel on its axis while winding the roving composed of a bundle of reinforcing fibers spirally around the molding surface of the mandrel along a circumferential direction to form the roving layers;

while molding a laminate for the groove by repeatedly performing the following steps:

a biaxial fabric layer forming step of rotating a cylindrical mandrel for the groove, of which the outer peripheral surface serves as a groove molding surface, on its axis while winding the biaxial fabric of a non-crimp structure composed of the two axes of reinforcing fiber bands around the groove molding surface of the mandrel for the groove to form the biaxial fabric layers; and a triaxial fabric layer forming step of rotating the mandrel for the groove on its axis while winding the triaxial fabric of a non-crimp structure composed of the three axes of reinforcing fiber bands around the groove molding surface of the mandrel for the groove to form the triaxial fabric layers; and thereafter going through the following steps:

a groove molding step of molding the laminate for the groove into a part corresponding to the groove by means of a groove molding die and the mandrel for the groove;

an integrating step of integrating the laminate for the groove, which is molded as the part corresponding to the groove in the groove molding step, and the laminate, which is molded as the part corresponding to the case main body, with each other; and a heating step of heating the laminate of the part corresponding to the case main body and the laminate for the groove molded as the part corresponding to the groove, which are integrated with each other in the integrating step, to cure the thermosetting resin with which the reinforcing fibers of the fabrics are impregnated.

10. A manufacturing method of the cylindrical case according to claim 3, including:

molding a laminate of a part corresponding to the case main body by repeatedly performing the following steps:

a biaxial fabric layer forming step of rotating a cylindrical mandrel, of which the outer peripheral surface serves as a case main body molding surface, on its axis while winding the biaxial fabric of a non-crimp structure composed of the two axes of reinforcing fiber bands around the molding surface of the mandrel to form the biaxial fabric layers; and a roving layer forming step of rotating the mandrel on its axis while winding the roving composed of a bundle of reinforcing fibers spirally around the molding surface of the mandrel along a circumferential direction to form the roving layers;

while molding a laminate for the groove by repeatedly performing the following steps:

a biaxial fabric layer forming step of rotating a cylindrical mandrel for the groove, of which the outer peripheral surface serves as a groove molding surface, on its axis while winding the biaxial fabric of a non-crimp structure composed of the two axes of reinforcing fiber bands around the groove molding surface of the mandrel for the groove to form the biaxial fabric layers; and a triaxial fabric layer forming step of rotating the mandrel for the groove on its axis while winding the triaxial fabric of a non-crimp structure composed of the three axes of reinforcing fiber bands around the groove molding surface of the mandrel for the groove to form the triaxial fabric layers; and thereafter going through the following steps:

a groove molding step of molding the laminate for the groove into a part corresponding to the groove by means of a groove molding die and the mandrel for the groove;

an integrating step of integrating the laminate for the groove, which is molded as the part corresponding to the groove in the groove molding step, and the laminate, which is molded as the part corresponding to the case main body, with each other; and a heating step of heating the laminate of the part corresponding to the case main body and the laminate for the groove molded as the part corresponding to the groove, which are integrated with each other in the integrating step, to cure the thermosetting resin with which the reinforcing fibers of the fabrics are impregnated.

11. A manufacturing method of the cylindrical case according to claim 2, including:

molding a laminate of a part corresponding to the case main body by repeatedly performing the following steps:

a biaxial fabric layer forming step of rotating a cylindrical mandrel, of which the outer peripheral surface serves as a case main body molding surface, on its axis while winding the biaxial fabric of a non-crimp structure composed of the two axes of reinforcing fiber bands around the molding surface of the mandrel to form the biaxial fabric layers; and a roving layer forming step of rotating the mandrel on its axis while winding the roving composed of a bundle of reinforcing fibers spirally around the molding surface of the mandrel along a circumferential direction to form the roving layers;

while molding a laminate for the groove by repeatedly performing the following steps:

a biaxial fabric layer forming step of rotating a cylindrical mandrel for the groove, of which the outer peripheral surface serves as a groove molding surface, on its axis while winding the biaxial fabric of a non-crimp structure composed of the two axes of reinforcing fiber bands around the groove molding surface of the mandrel for the groove to form the biaxial fabric layers; and a triaxial fabric layer forming step of rotating the mandrel for the groove on its axis while winding the triaxial fabric of a non-crimp structure composed of the three axes of reinforcing fiber bands around the groove molding surface of the mandrel for the groove to form the triaxial fabric layers; and thereafter going through the following steps:

a groove molding step of molding the laminate for the groove into a part corresponding to the groove by means of a groove molding die and the mandrel for the groove;

an integrating step of integrating the laminate for the groove, which is molded as the part corresponding to the groove in the groove molding step, and the laminate, which is molded as the part corresponding to the case main body, with each other; and a heating step of heating the laminate of the part corresponding to the case main body and the laminate for the groove molded as the part corresponding to the groove, which are integrated with each other in the integrating step, to cure the thermosetting resin with which the reinforcing fibers of the fabrics are impregnated.

12. A manufacturing method of the cylindrical case according to claim 4, including:

molding a laminate of a part corresponding to the case main body by repeatedly performing the following steps:

a biaxial fabric layer forming step of rotating a cylindrical mandrel, of which the outer peripheral surface serves as a case main body molding surface, on its axis while winding the biaxial fabric of a non-crimp structure composed of the two axes of reinforcing fiber bands around the molding surface of the mandrel to form the biaxial fabric layers; and a roving layer forming step of rotating the mandrel on its axis while winding the roving composed of a bundle of reinforcing fibers spirally around the molding surface of the mandrel along a circumferential direction to form the roving layers;

while molding a laminate for the groove by repeatedly performing the following steps:

a biaxial fabric layer forming step of rotating a cylindrical mandrel for the groove, of which the outer peripheral surface serves as a groove molding surface, on its axis while winding the biaxial fabric of a non-crimp structure composed of the two axes of reinforcing fiber bands around the groove molding surface of the mandrel for the groove to form the biaxial fabric layers; and a triaxial fabric layer forming step of rotating the mandrel for the groove on its axis while winding the triaxial fabric of a non-crimp structure composed of the three axes of reinforcing fiber bands around the groove molding surface of the mandrel for the groove to form the triaxial fabric layers; and thereafter going through the following steps:

a groove molding step of molding the laminate for the groove into a part corresponding to the groove by means of a groove molding die and the mandrel for the groove;

an integrating step of integrating the laminate for the groove, which is molded as the part corresponding to the groove in the groove molding step, and the laminate, which is molded as the part corresponding to the case main body, with each other; and a heating step of heating the laminate of the part corresponding to the case main body and the laminate for the groove molded as the part corresponding to the groove, which are integrated with each other in the integrating step, to cure the thermosetting resin with which the reinforcing fibers of the fabrics are impregnated.

* * * * *